US012167203B2

(12) United States Patent
Rybalko et al.

(10) Patent No.: US 12,167,203 B2
(45) Date of Patent: Dec. 10, 2024

(54) HEARING AID DEVICE

(71) Applicant: Oticon Medical A/S, Smørum (DK)

(72) Inventors: Oleksandr Rybalko, Smørum (DK); Jens Troelsen, Smørum (DK); Rune Sø, Smørum (DK); Morten Thougaard, Smørum (DK)

(73) Assignee: Oticon Medical A/S, Smørum (DK)

( * ) Notice: Subject to any disclaimer, the term of this patent is extended or adjusted under 35 U.S.C. 154(b) by 0 days.

(21) Appl. No.: 18/503,324

(22) Filed: Nov. 7, 2023

(65) Prior Publication Data

US 2024/0073633 A1 Feb. 29, 2024

Related U.S. Application Data

(63) Continuation of application No. 17/901,591, filed on Sep. 1, 2022, now Pat. No. 11,849,285, which is a continuation of application No. 17/115,969, filed on Dec. 9, 2020, now Pat. No. 11,463,826.

(30) Foreign Application Priority Data

Dec. 10, 2019 (EP) .................................... 19214794

(51) Int. Cl.
*H04R 25/00* (2006.01)
*H01Q 1/27* (2006.01)

(52) U.S. Cl.
CPC ........... *H04R 25/554* (2013.01); *H01Q 1/273* (2013.01); *H04R 25/609* (2019.05); *H04R 2225/51* (2013.01)

(58) Field of Classification Search
CPC ................ H04R 25/554; H04R 25/609; H04R 2225/51; H04R 25/606; H04R 2225/49; H04R 2225/57; H04R 25/603; H04R 25/00; H04R 9/18; H01Q 1/273
See application file for complete search history.

(56) References Cited

U.S. PATENT DOCUMENTS 7,230,574 B2 * 6/2007 Johnson ................. H01Q 1/243 343/702
10,136,230 B2 * 11/2018 Troelsen .............. H04R 25/305
2006/0033667 A1 2/2006 Johnson
(Continued)

FOREIGN PATENT DOCUMENTS

EP 2 835 863 A1 2/2015
EP 3 316 598 A1 5/2018
EP 3 413 584 A1 12/2018

OTHER PUBLICATIONS

Chinese Office Action for Chinese Application No. 202011449138.1, dated Apr. 18, 2024, with English translation.

*Primary Examiner* — Brian Ensey
(74) *Attorney, Agent, or Firm* — Birch, Stewart, Kolasch & Birch, LLP

(57) ABSTRACT

A hearing aid device includes at least one user input unit for controlling an operation mode of the hearing aid device, at least one signal line connecting the at least one user input unit with a control unit for controlling the hearing aid device, and an antenna module comprising at least two electrically conductive and electrically connectable layers forming a layered structure. The at least one user input unit is arranged at one of the layers of the antenna module, and the at least one signal line is provided at an inner surface of one of the layers facing one other layer.

16 Claims, 7 Drawing Sheets

(56) References Cited

U.S. PATENT DOCUMENTS

| | | | | |
|---|---|---|---|---|
| 2010/0156728 | A1 | 6/2010 | Alvey et al. | |
| 2015/0043763 | A1 | 2/2015 | Troelsen et al. | |
| 2016/0345110 | A1 * | 11/2016 | Gustafsson .......... | H04R 25/606 |

* cited by examiner

HEARING AID DEVICE

CROSS REFERENCE TO RELATED APPLICATIONS

This application is a Continuation of co-pending application Ser. No. 17/901,591, filed on Sep. 1, 2022, which is a Continuation of application Ser. No. 17/115,969, filed on Dec. 9, 2020 (now U.S. Pat. No. 11,463,826, issued Oct. 4, 2022), which claims priority under 35 U.S.C. § 119(a) to European Patent Application No. EP 19214794.0 filed on Dec. 10, 2019. Each of the above applications is hereby expressly incorporated by reference, in its entirety, into the present application.

FIELD

The present disclosure relates to hearing aid devices. More particularly, it also relates to bone anchored hearing aid devices. More particularly, it relates to an antenna for use in such (bone anchored) hearing aid solutions with a built-in push button.

BACKGROUND

The disclosure is applicable to various hearing aid devices. The example description refers to a bone anchored one, however, this does not limit the applicability to others. In a bone anchored hearing solution (BAHS) it is difficult to reach the needed antenna performance, since the components of such a hearing aid solution like, e.g., a vibrator, a battery, a printed circuit board (PCB) comprising the electronic components, such as a push button and other metal parts, are placed extremely close to each other. The restricted space and the resulting close arrangement of the components of the hearing aid solution limit, e.g., the antenna bandwidth and the antenna radiation efficiency. Furthermore, the difference in performance between having a BAHS on the left or the right side of the head can be significant. Therefore, there is a need to provide a solution that allows for providing an antenna concept that achieves a needed antenna performance while integrating the mechanical and electrical concept of BAHS in a limited space.

SUMMARY

According to an aspect, a hearing aid device, comprises at least one user input unit for controlling an operation mode of the hearing aid device, at least one signal line connecting the at least one user input unit with a control unit for controlling the hearing aid device, and where the control unit is arranged within the hearing aid device, and an antenna module comprising at least two electrically conductive and electrically connectable layers forming a layered structure. The at least one user input unit is arranged at one of the layers of the antenna module, and the at least one signal line is provided at an inner surface of one of the layers facing one other layer.

The at least one signal line may be provided at a surface of one of the layers facing one other layer, e.g. the at least on signal line may be arranged between the layers.

This structure allows for a compact integration of user input units and antenna components without sacrificing the antenna performance. In particular, the layered structure allows an electromagnetic shielding of the signal lines from the antenna module.

The antenna module is, with reference to a first direction, perpendicular to a thickness direction of the layered structure, composed of a first portion, an antenna feed connection and an antenna short connection, wherein the antenna feed connection and the antenna short connection are separated by a distance in a second direction perpendicular to the first and the thickness direction.

According to yet another aspect, the radiation and bandwidth properties of the antenna module are settable by at least one of the distance between the antenna feed connection and the antenna short connection in the second direction, and a distance between the distal end of the first portion of the antenna module and a main ground plane portion of the hearing aid device in the first direction.

The antenna module, with reference to the first direction further comprises a bendable portion connecting the first portion with a second portion, wherein the bendable portion is provided at a distal end of the first portion opposed to the antenna feed connection and the antenna short connection, and wherein the antenna module further comprises the second portion.

According to yet another aspect, the radiation and bandwidth properties of the antenna module are further settable by a length of the antenna module in the first direction consisting of the first portion, the bendable portion and the second portion of the antenna module.

This allows for providing different antenna configurations, which may be needed, e.g., on the right side of the user's head than on the left side.

According to another aspect, one of the two or more electrically conductive layers is a ground layer.

According to yet another aspect, the antenna short connection is connected with the ground layer.

According to another aspect, the first portion of the antenna is a Planar Inverted F-Antenna PIFA antenna.

According to yet another aspect, the hearing aid device further comprises a stimulating device for converting a sound signal into mechanical vibrations.

According to another aspect, the stimulating device comprises a first side facing the skull of the user of the hearing aid device, and a second side facing the antenna module.

According to yet another aspect, the at least one user input unit is contained in the ground layer of the antenna module.

By this structure, it is possible to eliminate the impact of the at least one user input unit on the radiation and bandwidth performance of the antenna module.

According to another aspect, the at least one signal line is passing through the antenna short connection in one of the interior layers of the layered structure of the antenna module.

According to yet another aspect, the at least one signal line is located in a layer different from the ground layer, and the at least one signal line is connected to the ground layer by means of capacitors.

According to another aspect, the capacitors are placed at least at one of a position next to the user input unit, a position next to the bendable portion located at the distal end of the first portion of the antenna, and at a position next to the antenna short connection at the main ground plane portion.

According to yet another aspect, the antenna module is provided with an inductive element configured to electrically decouple the antenna module from the stimulating device.

According to yet another aspect, the antenna module may include a parasitic element for enhancing the bandwidth of the antenna. The at least one user input unit is arranged at one of the layers of the antenna module, and on that layer the parasitic element may be formed. The parasitic element may be the wiring formed into the layer or a metal sheet provided onto the layer. The parasitic element is inductively in connection with the active part of the antenna module. The active part may be formed by the first portion of the antenna module.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
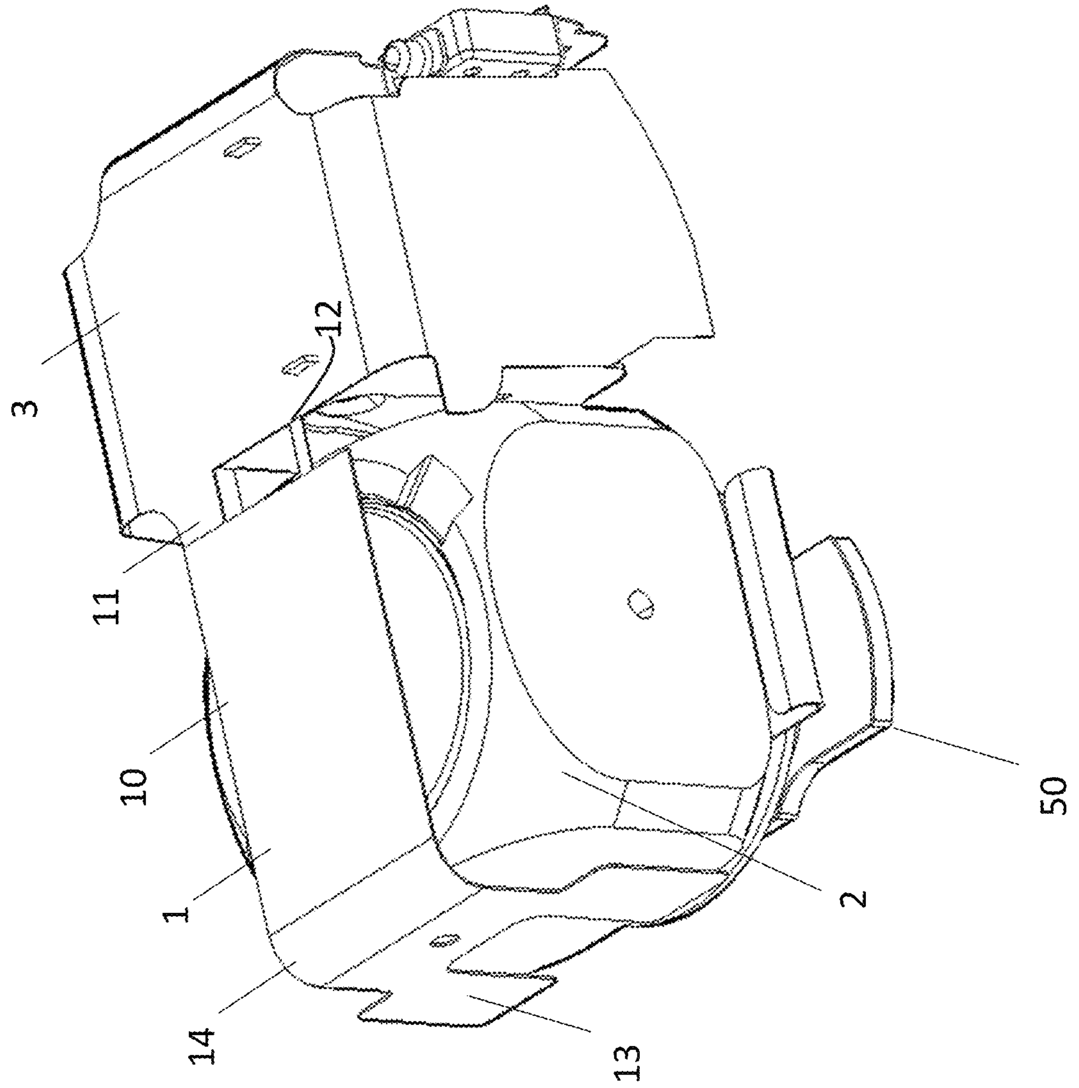
FIG. 1 illustrates a perspective view of a simplified hearing aid device according to an embodiment of the disclosure.

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal such as in a Behind-the-Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a SmartPhone or other electronic device, the SmartPhone/ electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a control unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The control unit may include an amplifier that is adapted to apply a frequency dependent gain to the input audio signal. The control unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

It is to be understood that in the following "arranged at/on", "provided in/on", "contained in", "included in" are used as synonyms.

Now referring to FIG. 1, this figure illustrates a perspective view on a simplified hearing aid device according to an embodiment of the disclosure. The illustrated hearing aid device has an antenna module 1, comprising a first portion 10. In the present embodiment, the antenna module 1 further comprises an antenna short connection 11 and an antenna feed connection 12 positioned at a distal end in a first direction of the antenna module 1. The first direction is perpendicular to the thickness direction of the antenna structure. In addition, the antenna short connection 11 and the antenna feed connection 12 are separated by a distance in a second direction perpendicular to the first direction and the thickness direction.

Additionally, the antenna module 1 comprises a bendable portion 14, connecting the first portion 10 of the antenna module 1 with a second portion 13 of the antenna module 1. The bendable portion 14 is provided—in the first direction of the antenna module 1—at the distal end of the first portion 10 of the antenna module 1, i.e., the end, which is opposed to the position of the antenna short connection 11 and the antenna feed connection 12.

In the present embodiment, the second portion 13 comprises one or more user input units 4 (also referred to as push button). The user input unit(s) 4 control(s) an operation mode of the hearing aid device. Such an operation mode may comprise, e.g., modes related to Bluetooth™, near field communication (NFC), Wi-Fi™ and/or ZigBee™. The push button(s) 4 is (are) contained in the antenna module 1. Moreover, the hearing aid device further comprises (the) signal line(s) (push button line(s)) 16 connecting the push button(s) 4 with the control unit of the hearing aid device. This signal line(s) is (are) squeezed between layers of the antenna module 1, i.e., is (are) provided at the inner surface of one of the layers facing one other layer.

The antenna module 1 comprises at least two electrically conductive and electrically connectable layers, which form a layered structure. FIG. 2A illustrates a zoom-in into a part of the antenna structure denoted with "*" in FIG. 1. As it can be seen in FIG. 2A, the antenna in the present embodiment is, in a thickness direction, a layered structure (sandwich) consisting of a three layered PCB structure. However, the present invention is not limited to this. A two layered, four layered, five layered, etc., PCB structure could be used as well. Moreover, all layers are connected through vias 15 in the present embodiment. In addition, one of the layers of the antenna module 1 is a ground layer. Further, three signal lines 16 for the user input unit 4 are shown. They are provided on the second, i.e., inner layer of the three layer PCB structure.

In case of a two layered antenna structure, these are provided at an inner side of one of the two layers, i.e., the side of the layer facing the other layer's inner side. In case of three or more layers, the signal lines are provided at an arbitrary inner surface of one of the inner layers.

Furthermore, the above described antenna short connection 11 is connected with the ground layer.

Furthermore, as shown in FIG. 1, the hearing aid device comprises a stimulating device 2, e.g., a vibrator 2 that converts a sound signal into mechanical vibrations. The vibrator 2 has a first side, which faces the skull of the user of the hearing aid device. A second side of the vibrator 2 is located opposite to the first side of the vibrator 2, to which the antenna module 1 is arranged.

In addition, the hearing aid device further comprises a main ground plane portion 3.

The hearing aid device comprises an abutment connector 50 which is configured to be attachable to an abutment fixture (not shown) arranged on a skull of the recipient. In most cases the abutment fixture is applied onto a screw (not shown) which is screwed into the skull of the recipient, and while the hearing aid device is applied onto the abutment fixture via the abutment connector, the hearing aid device is configured to apply vibrations to the skull via the abutment fixture and the screw. On a first side of the vibrator 2 the abutment connector 50 is arranged and on at least a second side of the vibrator 2 the antenna module 1 is arranged, and where the first side and the second side are not the same side of the vibrator 2. The antenna module 1 is arranged on multiple other sides of the vibrator (2), where the other sides are different from the first side. The advantage of arranging the antenna module (1) on a different side of the abutment connector is to obtain that the vibrator does not provide any shadow effect in a direction away from the skull. Thereby, the radiation efficiency of the antenna module 1 is then not affected by the vibrator (2). The abutment connector 50 is arranged closer to the skull of the recipient than the active part of the antenna module 1. Furthermore, the active part of the antenna module (1) is arranged on an opposite side to the first side. By effect of applying the active part of the antenna module on the opposite side and not a side which is not opposite is an improved radiation in a direction away from the skull of the recipient. For example, if applying the active part on a side not opposite to the first side, for example, if the active part is pointing downwards when the recipient is using the hearing aid device will results in a very limited radiation efficiency in an upwards direction and in a radially direction partially parallel to an ear-to-ear axis between the left ear and the right ear of the recipient. But, arranging the active part on the opposite side will result in a more uniformly radiation efficiency in any directions away from the skull of the recipient, either upwards, downwards or radially away from the ear to ear axis.

Figure 2B:
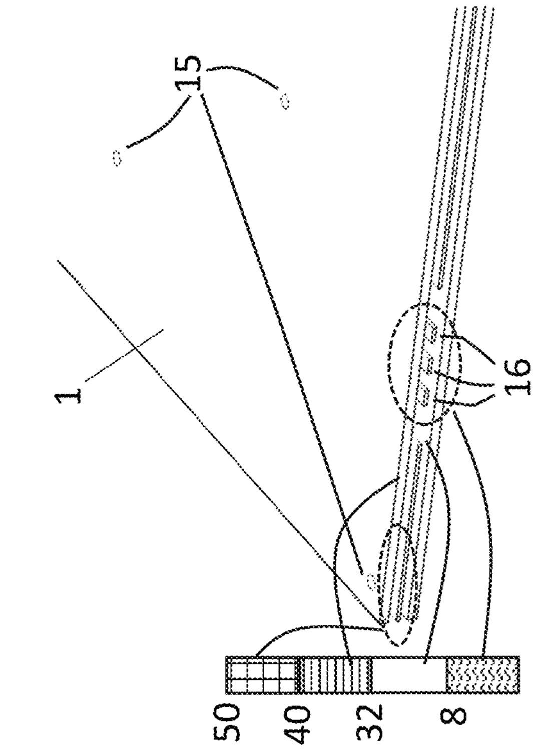
FIG. 2B illustrates the current distribution at 2.44 GHz in the zoomed-in part of FIG. 2A of the simplified hearing aid device according to the embodiment.
Figure 2A:
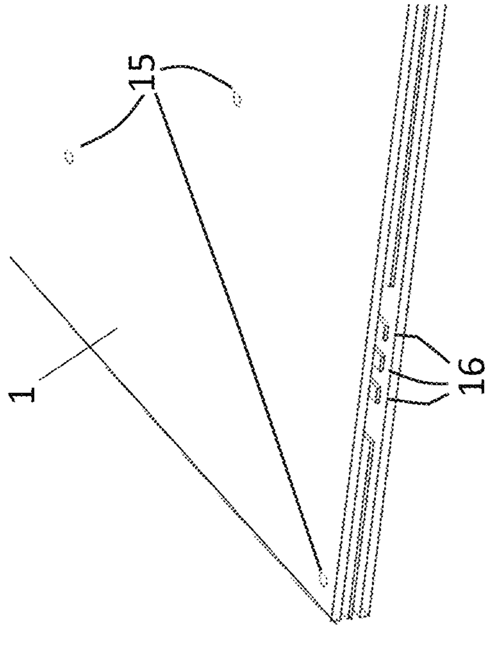
FIG. 2A illustrates a zoom-in into a part of the simplified hearing aid device according to the embodiment.

FIG. 2B illustrates the current distribution for a simulated frequency of 2.44 GHz in the zoomed-in part of FIG. 2A. The legend on the left hand side indicates the strength of the magnetic field in A/m. As in FIG. 2A, three signal lines 16 for the push button 4 are shown as well. It can be seen that the magnetic field strength is negligible on the signal lines 16.

Figure 3:
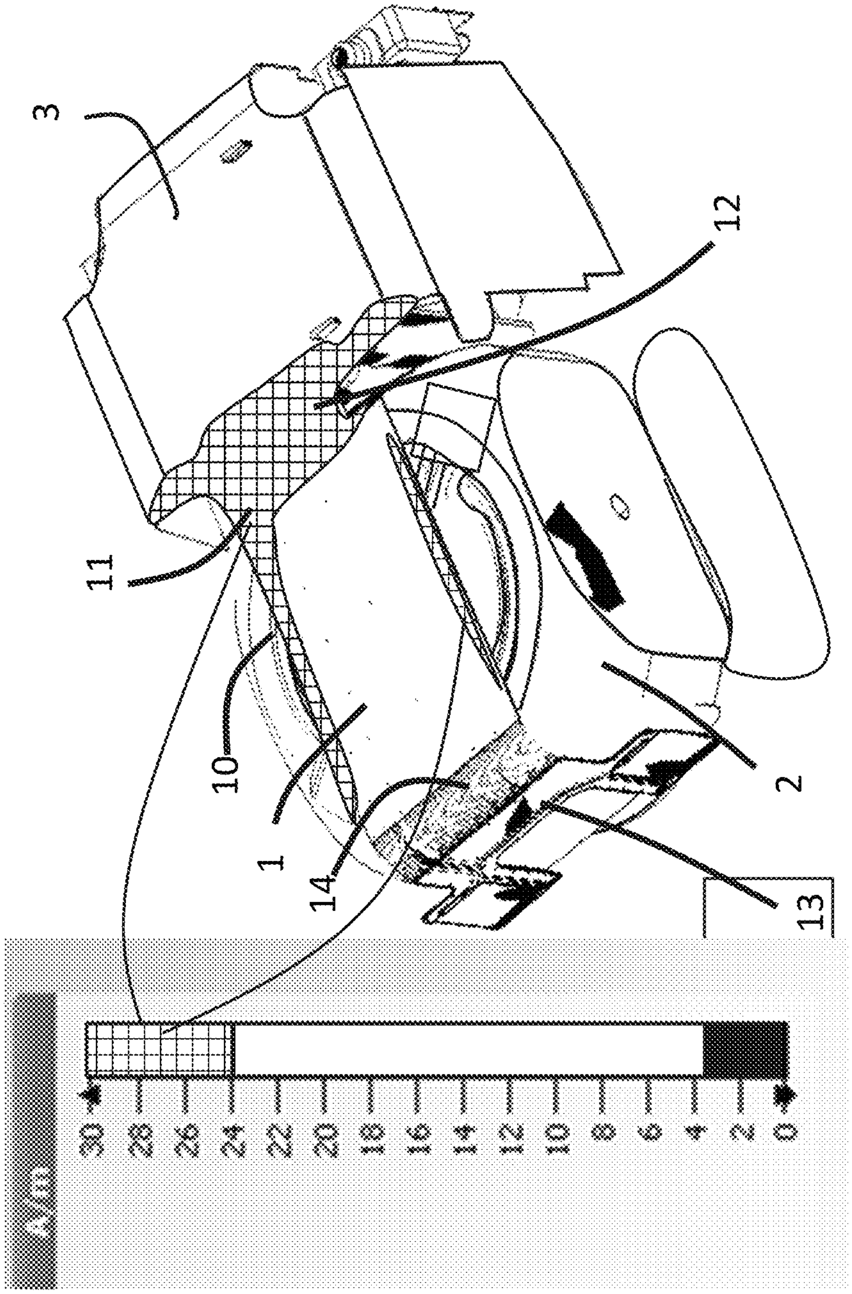
FIG. 3 illustrates the current distribution at 2.44 GHz of the simplified hearing aid device according to the embodiment.

FIG. 3 illustrates the resulting current distribution for a simulated frequency of 2.44 GHz for the complete simplified hearing aid device as illustrated in FIG. 1. As shown in FIG. 3, only an active part of the antenna module radiates. In this embodiment, this part is formed by the first portion 10 of the antenna module 1 and is implemented by a planar inverted F antenna (PIFA). Again, the legend on the left hand side indicates the strength of the magnetic field in A/m.

In the present embodiment the push button 4 is included in the ground layer. By this structure, it is possible to eliminate the impact of the push button 4 on the radiation and bandwidth performance of the antenna module 1. Furthermore, a copper area is available around each push button 4 in another aspect of the embodiment. This further improves the radiation and bandwidth performance of the antenna module 1.

As can be seen in FIG. 3, the current distribution is not symmetrical around the PCB layer of the antenna, which is inherent to the PIFA current distribution. The current flows from the antenna feed connection 12 to the ground layer of the antenna in a loop. As a result, a high current density is present on the right side of the antenna module 1 (i.e., the side, where the antenna short connection 11 is placed). However, the current may also be available on the left side of the antenna module 1, however, this current is smaller.

In the present embodiment, the top part of the vibrator 2 (the second side of the vibrator 2) is placed very close to the antenna PCB module 1 (e.g., 3 mm). Thereby, a capacitive coupling effect between the antenna module 1 and the vibrator 2 could be seen. In the present embodiment, however, the vibrator 2 is decoupled and it is not a part of the configuration of the antenna module 1. For instance, for a desired operating frequency of 2.4 GHz, two 33 nH coils can be used for this purpose.

Figure 4:
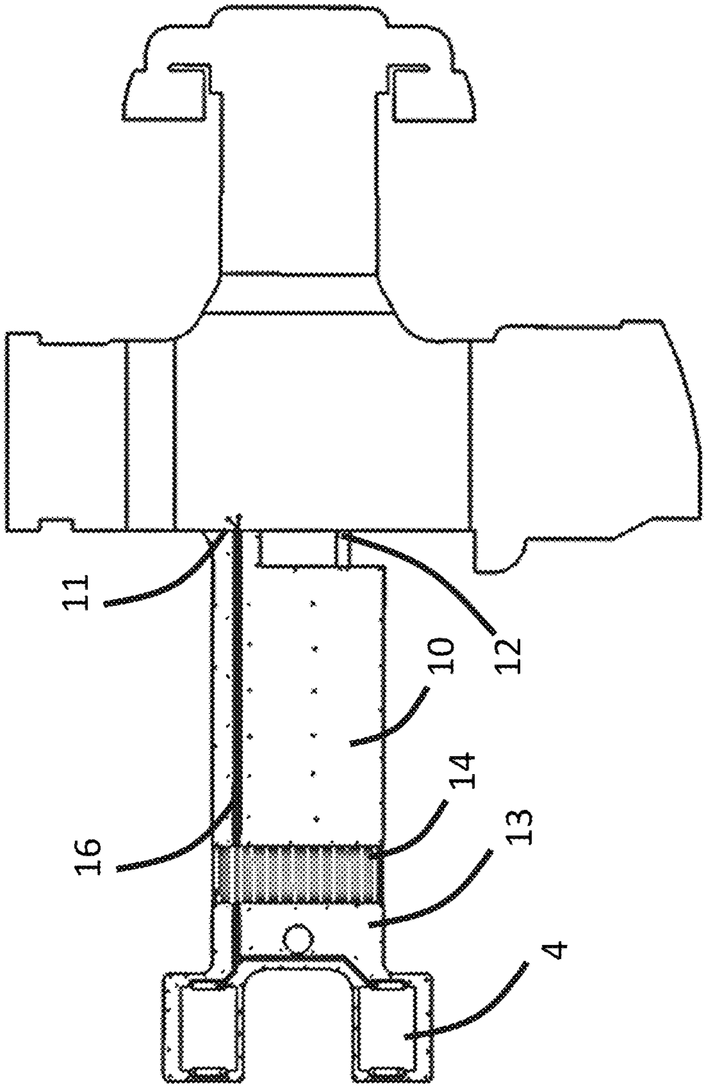
FIG. 4 illustrates the unfolded PCB structure of the simplified hearing aid device according to the embodiment.

FIG. 4 shows the PCB layout of all layers while being projected on each other. A particular embodiment is shown, where the first portion 10 and second portion 13 as well as the bendable portion 14 of the antenna module 1 are unfolded in the two dimensional plane. As a result, it becomes clear that the representation in FIG. 1 can be obtained by wrapping the structure of FIG. 4 around the vibrator 2 such that the first portion 10 is placed on top of the vibrator 2, i.e., on the second side of the vibrator 2, while the second portion 13 is bent to the bottom left of the vibrator 2.

Figure 5:
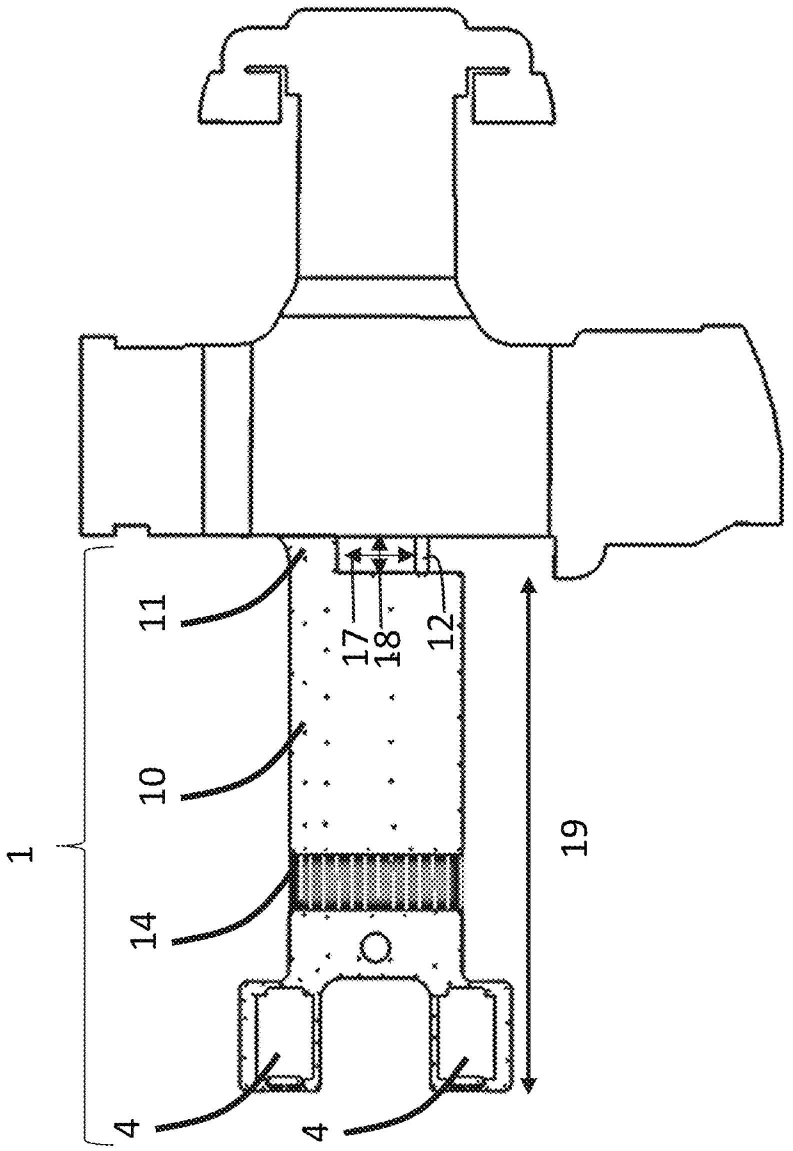
FIG. 5 illustrates the tuning possibilities of antenna characteristics of the unfolded PCB structure of the simplified hearing aid device according to the embodiment.

Yet another view is presented in FIG. 5, which again presents the PCB with all layers projected in a two dimensional plane. In particular, it emphasizes how the radiation and bandwidth properties of the antenna module 1 are settable. In one embodiment, the parameters of the antenna module 1 are determined by the distance 17 between the antenna short connection 11 and the antenna feed connection 12, the distance 18 between the distal end of the first portion 10 of the antenna module 1 and the main ground portion 3 of the hearing aid device. Additionally, in another embodiment, the parameters of the antenna module 1 may also be determined by the overall length 19 of the antenna module 1 in the first direction consisting of the first portion 10, the bendable portion 14 and the second portion 13 of the antenna module.

These parameters can be chosen and configured dependent on the specific case of application, e.g., the user's needs. For instance, if a different antenna configuration is needed on the right side of the user's head than on the left side, the respective parameters may be adjusted for improved radiation and bandwidth properties.

Figure 6:
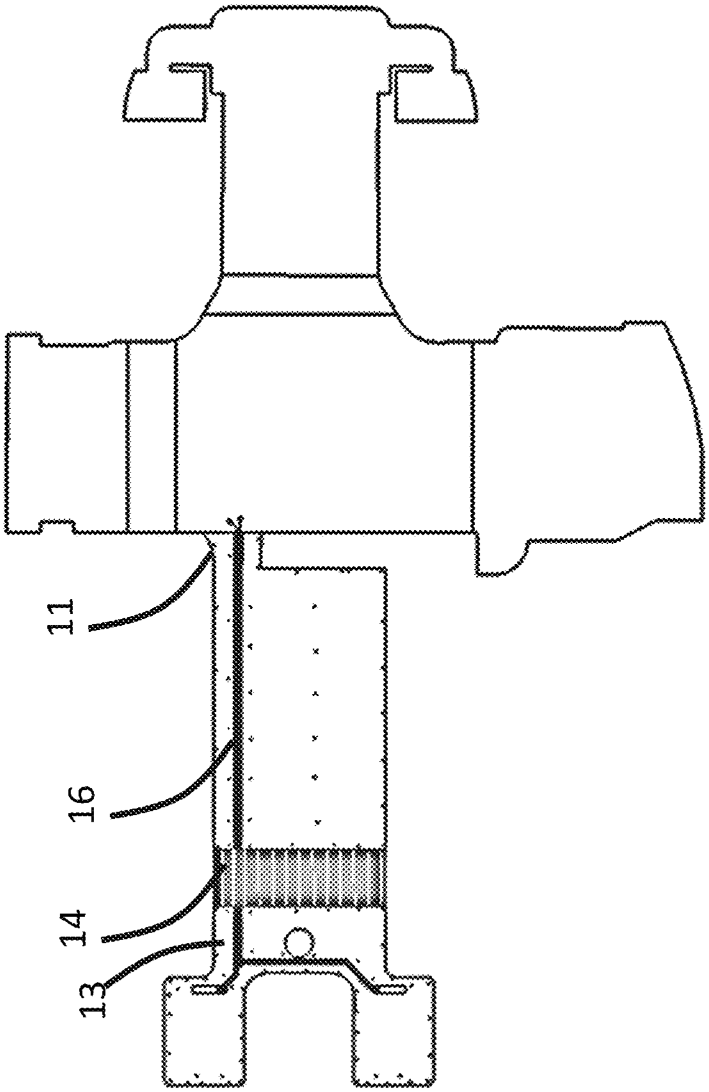
FIG. 6 illustrates the antenna structure without a top layer of the PCB according to the embodiment.

In FIG. 6 the ground layer of the layered PCB layout is depicted in dark gray color. The signal lines 16 run through the antenna short connection 11 in the middle layer and are squeezed between the other layers of the PCB. As a result, the signal lines 16 have no effect on the radiation or bandwidth properties of the antenna module 1. While ensuring a very good coupling between the layers, and keeping the signal lines 16 between the layers, the signal lines 16 do not effect the radiation or bandwidth properties of the antenna module 1, even if the signal lines 16 are varying in length due to different possible positions of the push buttons 4. In case of very long signal lines 16 or if a proper arrangement in the middle layer is not completely possible, the use of additional capacitors 5 is possible.

Figure 7:
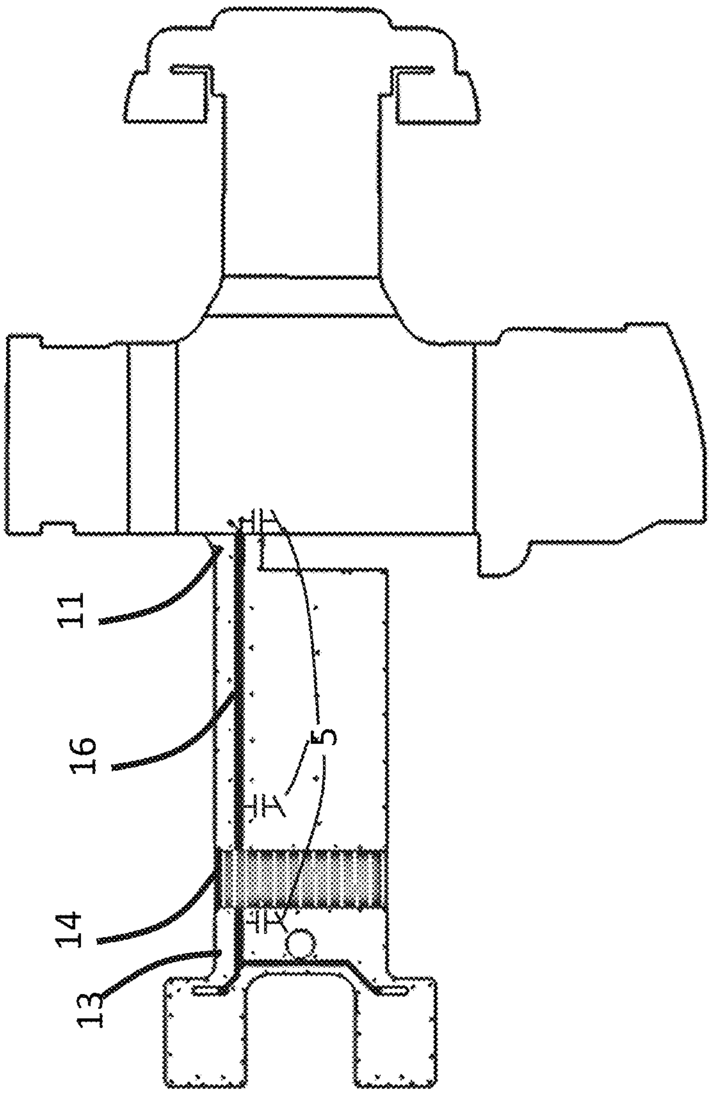
FIG. 7 illustrates possible positions of capacitors in the antenna structure according to the embodiment.

This principle is illustrated in FIG. 7, where additional capacitors 5 are used to improve the properties of the antenna module 1. They can be placed at various positions between the signal lines 16 and the ground layer, e.g., at a position next to the push button 4, at a position next to the bendable portion 14 located at the distal end of the first portion 10 of the antenna 1 or at a position next to antenna short connection 11 at the main ground plane portion 3. These capacitors usually have a capacity of 10-15 pF. As a result, a very good bandwidth of 300 MHz for the 6 dB marker can be achieved.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing aid device, comprising:

a stimulating device configured to convert a sound signal into mechanical vibrations;

an abutment connector configured to fix the hearing aid device to a skull of a recipient of the hearing aid device;

at least one user input unit configured to control an operation mode of the hearing aid device;

at least one signal line connecting the at least one user input unit with a control unit configured to control the hearing aid device, wherein the control unit is arranged within the hearing aid device; and an antenna module comprising at least two electrically conductive and electrically connectable layers forming a layered structure, wherein one of the at least two electrically conductive and electrically connectable layers is a ground layer;

wherein the at least one user input unit is arranged at one of the layers of the antenna module;

wherein the at least one signal line is provided at an inner surface of one of the layers facing one other layer;

wherein the abutment connector is arranged on a first side of the stimulating device;

wherein an active part of the antenna module is arranged on an opposite side to the first side;

wherein the at least one signal line is located in a layer different from the ground layer, and the at least one signal line is connected to the ground layer by capacitors; and wherein the capacitors are placed at least at one of a position next to the at least one user input unit, a position next to a bendable portion located at a distal end of a first portion of the antenna module, and at a position next to an antenna short connection at the main ground plane portion.

2. The hearing aid device according to claim 1, wherein the antenna module is, with reference to a first direction, perpendicular to a thickness direction of the layered structure, composed of the first portion, an antenna feed connection, and the antenna short connection, wherein the antenna feed connection and the antenna short connection are separated by a distance in a second direction perpendicular to the first and the thickness direction.

3. The hearing aid device according to claim 2, wherein radiation and bandwidth properties of the antenna module are settable by at least one of a distance between the antenna feed connection and the antenna short connection in the second direction, and a distance between the distal end of the first portion of the antenna module and a main ground plane portion of the hearing aid device in the first direction.

4. The hearing aid device according to claim 2, wherein the antenna module, with reference to the first direction further comprises the bendable portion connecting the first portion with a second portion, wherein the bendable portion is provided at the distal end of the first portion opposed to the antenna feed connection and the antenna short connection, and wherein the antenna module further comprises the second portion.

5. The hearing aid device according to claim 4, wherein the radiation and bandwidth properties of the antenna module are further settable by a length of the antenna module in the first direction consisting of the first portion, the bendable portion and the second portion of the antenna module.

6. The hearing aid device according to claim 1, wherein the antenna short connection is connected with the ground layer.

7. The hearing aid device according to claim 1, wherein the first portion is a Planar Inverted F-Antenna PIFA antenna.

8. The hearing aid device according to claim 1, wherein the at least one user input unit is contained in the ground layer of the antenna module.

9. The hearing aid device according to claim 1, wherein the at least one signal line is passing through the antenna short connection in an interior layer of the layered structure of the antenna module.

10. The hearing aid device according to claim 8, wherein the antenna module is provided with an inductive element configured to electrically decouple the antenna module from the stimulating device.

11. The hearing aid device according to claim 1, wherein the abutment connector is configured to be arranged closer to the skull of the recipient than the active part of the antenna module.

12. The hearing aid device according to claim 2, wherein the first portion is a Planar Inverted F-Antenna PIFA antenna.

13. The hearing aid device according to claim 3, wherein the first portion is a Planar Inverted F-Antenna PIFA antenna.

14. The hearing aid device according to claim 4, wherein the first portion is a Planar Inverted F-Antenna PIFA antenna.

15. The hearing aid device according to claim 5, wherein the first portion is a Planar Inverted F-Antenna PIFA antenna.

16. The hearing aid device according to claim 6, wherein the first portion is a Planar Inverted F-Antenna PIFA antenna.

* * * * *